US010956168B2

(12) United States Patent
Francois et al.

(10) Patent No.: US 10,956,168 B2
(45) Date of Patent: Mar. 23, 2021

(54) POST COMPLETION EXECUTION IN AN OUT-OF-ORDER PROCESSOR DESIGN

(71) Applicant: International Business Machines Corporation, Armonk, NY (US)

(72) Inventors: Avery Francois, Austin, TX (US); Christian Jacobi, West Park, NY (US); Gregory William Alexander, Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 11 days.

(21) Appl. No.: 16/296,621

(22) Filed: Mar. 8, 2019

(65) Prior Publication Data

US 2020/0285482 A1   Sep. 10, 2020

(51) Int. Cl.
*G06F 9/38* (2018.01)

(52) U.S. Cl.
CPC .......... *G06F 9/3855* (2013.01); *G06F 9/3838* (2013.01); *G06F 9/3869* (2013.01)

(58) Field of Classification Search
None
See application file for complete search history.

(56) References Cited

U.S. PATENT DOCUMENTS

| | | | |
|---|---|---|---|
| 5,495,587 A | 2/1996 | Comfort et al. | |
| 6,079,014 A * | 6/2000 | Papworth | G06F 9/3806 712/1 |
| 7,055,021 B2 * | 5/2006 | Kadambi | G06F 9/3838 712/217 |
| 7,412,589 B2 | 8/2008 | Feiste | |
| 7,711,934 B2 * | 5/2010 | Kishore | G06F 9/3017 712/216 |
| 2002/0091913 A1 * | 7/2002 | Fukagawa | G06F 9/3842 712/218 |
| 2005/0038976 A1 | 2/2005 | Miller | |
| 2007/0204135 A1 * | 8/2007 | Jiang | G06F 9/3836 712/214 |
| 2013/0007423 A1 | 1/2013 | Burcea et al. | |
| 2013/0086361 A1 * | 4/2013 | Gschwind | G06F 9/3005 712/205 |
| 2013/0086362 A1 * | 4/2013 | Gschwind | G06F 9/30 712/205 |
| 2014/0281402 A1 * | 9/2014 | Comparan | G06F 9/3838 712/214 |
| 2014/0325187 A1 * | 10/2014 | Estlick | G06F 9/3838 712/214 |
| 2015/0277916 A1 * | 10/2015 | Khartikov | G06F 9/3855 712/205 |

(Continued)

*Primary Examiner* — Michael Sun
(74) *Attorney, Agent, or Firm* — Cantor Colburn LLP; William Kinnaman

(57) ABSTRACT

A computer data processing system includes an instruction pipeline having a front end and a back end, a decoding and dispatch unit to dispatch a current instruction; and a pipeline by-pass unit to invoke an out-of-order pipeline by-pass operation. The pipeline by-pass unit by-passes a section of the instruction pipeline such that the current instruction architecturally completes before initiating instruction execution. The computer data processing system further includes a post-completion execution unit that executes the current instruction after the current instruction architecturally completes.

16 Claims, 6 Drawing Sheets

(56) References Cited

U.S. PATENT DOCUMENTS

2016/0117175 A1     4/2016  Alexander et al.
2017/0300336 A1    10/2017  Barrick et al.
2018/0074789 A1*    3/2018  Sakashita ................. G06F 7/57
2018/0267807 A1*    9/2018  Burger ................ G06F 15/7839

* cited by examiner

POST COMPLETION EXECUTION IN AN OUT-OF-ORDER PROCESSOR DESIGN

BACKGROUND

The present invention relates generally to the field of instruction processing and more particularly to out-of-order superscalar multi-threaded microprocessor systems.

Traditional out-of-order microprocessors typically perform execution after instruction issue and prior to instruction completion. This traditional architecture facilities pipeline execution by holding instructions at the issue stage until all dependencies are satisfied before completing execution.

SUMMARY

According to an embodiment described herein, a computing system comprises an instruction pipeline having a front end and a back end, a decoding and dispatch unit to dispatch a current instruction; and a pipeline by-pass unit to invoke an out-of-order pipeline by-pass operation. The pipeline by-pass unit by-passes a section of the instruction pipeline such that the current instruction architecturally completes before initiating instruction execution. The computer data processing system further includes a post-completion execution unit that executes the current instruction after the current instruction architecturally completes.

According to another non-limiting embodiment, a method is provided for controlling an order of an instruction pipeline of an out-of-order data processing system. The method comprises establishing an instruction pipeline including a front end and a back end, and dispatching a current instruction. The method further comprises invoking an out-of-order pipeline by-pass operation, and by-passing a section of the instruction pipeline such that the current instruction architecturally completes before initiating instruction execution; and executing, via a post-completion execution unit, the current instruction after the current instruction architecturally completes.

According to yet another non-limiting embodiment, a computer program product is provided for controlling an electronic device to control an order of an instruction pipeline of an out-of-order data processing system. The computer program product comprises a computer readable storage medium having program instructions embodied therewith. The program instructions are executable by an electronic computer processor to control the electronic device to perform operations comprising invoking an out-of-order pipeline by-pass operation, by-passing a section of the instruction pipeline such that the current instruction architecturally completes before initiating instruction execution; and executing, via a post-completion execution unit, the current instruction after the current instruction architecturally completes.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
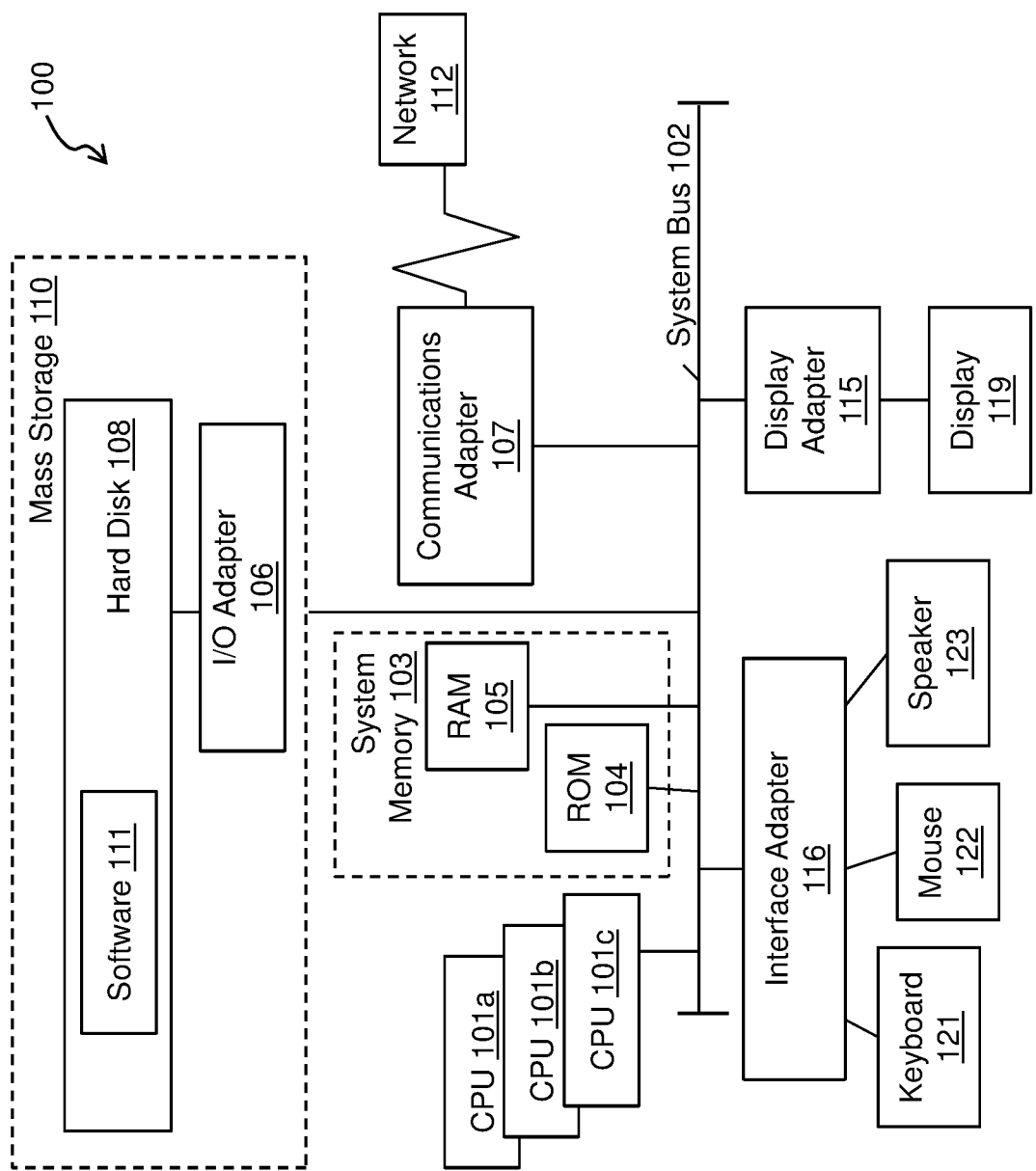
FIG. 1 is a block diagram of an example computer system for practicing the teachings herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Traditional out-of-order processing systems require valuable hardware resources to track the large complex instructions. These resources include mapper entries, issue queue entries, dependency tracking states, and large out-of-order execution interfaces. Complex instructions can be highly serialized in nature, limiting the benefits of these out-of-order resources due to the limited instruction level parallelism.

The out-of-order pipeline according to one or more non-limiting embodiments provides a by-pass operation that moves the execution of these highly serialized instructions to after the instruction completion boundary (i.e., after completion of the instruction). This allows an instruction to bypass the traditional processor pipeline and architecturally complete before starting execution of the instruction, essentially moving the start of the execution pipeline to the tail end of the traditional processor pipeline. The term "architecturally complete" refers to an instruction that has become executed and committed from a software perspective such that, from the standpoint of a program executing on the processor, the instruction has executed and its execution cannot be prevented due to branch misprediction, exceptional conditions, or asynchronous events. From the program's perspective, the instruction has also produced results, although there may be effects that the software observes as delays in executing and completing subsequent instructions. In terms of adding two values, for example, an architecturally complete instruction does not necessarily require that the two numbers have been added together, but rather that the system has committed to adding the two numbers together, and there is no longer an option to perform a flush operation.

Various non-limiting embodiments described herein provide a multi-threaded out-of-order superscalar microprocessor system configured to execute a pipeline order that allows an instruction to architecturally complete before starting instruction execution. In at least one embodiment, the out-of-order microprocessor system utilizes a global completion table (GCT) and a large out-of-order execution pipeline that facilitates a method of executing complex instruction post-completion by bypassing the traditional execution pipeline. Accordingly, instructions from other threads or more instructions from the same thread can then fit in to the processor's out-of-order window, thereby improving out-of-order processor performance.

In addition, traditional processor execution pipelines require tracking complex instructions as they flow through the processor, even if those instructions are serialized in nature and cannot effectively be reordered due to existing dependency chains. However, the out-of-order processing system described herein avoids allocating out-of-order resources for sequences of serialized complex instructions. Rather, the out-of-order processing system described herein can force instructions to execute in-order and without the need to use out-of-order resources.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others.

As shown in FIG. 1, the computer system 100 has one or more central processing units (CPU(s)) 101a, 101b, 101c, etc. (collectively or generically referred to as processor(s) 101). The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110. A software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate as described herein. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1.

Figure 2:
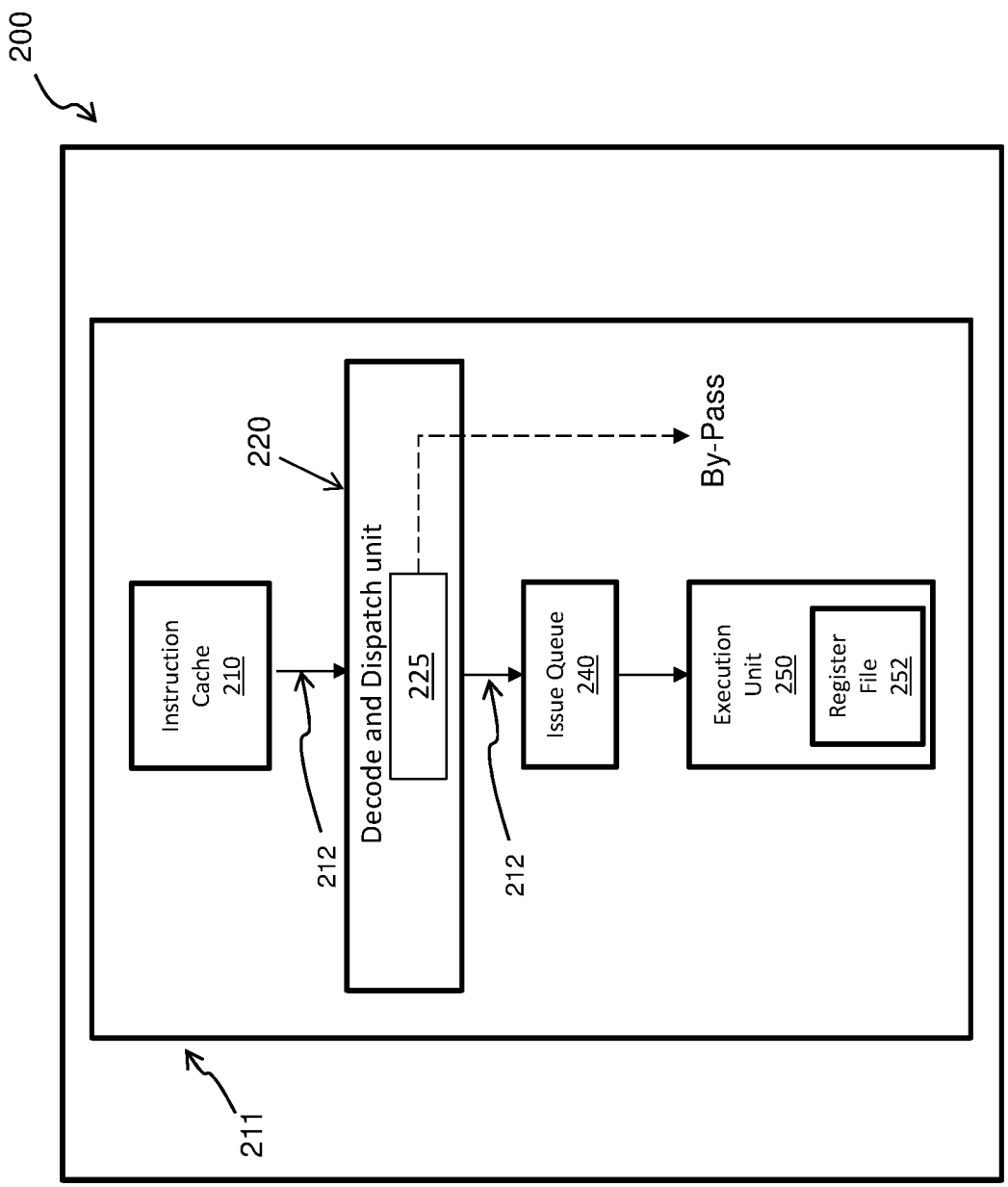
FIG. 2 is a block diagram of an instruction processing system in accordance with an embodiment.

Referring now to FIG. 2, a block diagram depicting a portion of an instruction processing system 200 in accordance with at least one embodiment of the present invention is shown. As depicted, the instruction processing system 200 includes an instruction pipeline 211, which each include an instruction cache 210, an instruction decoding and dispatch unit 220, an issue queue 240, and an execution unit 250. The pipeline 211 has a dedicated register file 252. The decoding and dispatch unit 220 and/or the execution unit 250 can each be constructed as an individual electronic hardware controller that includes memory and a processor configured to execute algorithms and computer-readable program instructions stored in the memory. The instruction processing system 200 may include other elements needed for executing computer instructions that are omitted for the sake of simplicity. Furthermore, the complexity of the depicted elements is generally omitted for the sake of simplicity.

The instruction cache 210 stores processing instruction(s) 212. In one or more embodiments, the instructions include an execution component that can be executed by the instruction processing system 200. In some embodiments, the instruction cache 210 stores one or more cache lines. One or more program counters (not shown) may provide an address to the instruction cache 210 indicating the current index of an executed program within memory. In response thereto, the instruction cache 210 immediately, or after retrieving a page or line of instructions from main memory, provides instructions 212 to the instruction decoding and dispatch unit 220.

The instruction decoding and dispatch unit 220 parses the instructions 212 and determines that the instructions 212 include a general purpose register (GPR) write. In one embodiment, the decoding and dispatch unit 220 decodes a portion of the instruction into a logical register type and a logical register number (i.e., logical register reference). The issue queue 240 queues the instructions 212 as well as the register file 252 and provides them as needed to the execution unit 250. The execution unit 250 executes the instructions 212 and stores data relating to the instruction in one or more of the register files 252. In one or more embodiments, the execution unit 250 executes a current instruction 212 by performing a modular arithmetic operation. In other embodiments, the execution unit 250 executes a current instruction 212 by accessing a register that is larger than a GPR.

The instruction decoding and dispatch unit 220 further includes a pipeline by-pass unit 225. The pipeline by-pass unit 225 is configured to invoke an out-of-order pipeline by-pass operation that effectively skips or by-passes allocation of critical out-of-order hardware resources, and instead allows a dispatched instruction to architecturally complete before initiating instruction execution. In one or more embodiments, the pipeline by-pass unit 225 can be constructed as an individual electronic hardware controller that includes memory and a processor configured to execute algorithms and computer-readable program instructions stored in the memory. In other embodiments, the by-pass unit 225, along with the instruction decoding and dispatch unit 220 and/or the execution unit 250 can be implemented in a single processor, e.g., a single multi-threaded out-of-order superscalar microprocessor.

In exemplary embodiments, when an instruction is decoded by the decoding and dispatch unit 220, it is determined if the instruction includes a GPR write micro operation that will only be accessed by the pipeline that executes the instruction. In these cases, the GPR write for the other pipelines is blocked, thereby reducing the power consumption of the processing system. In exemplary embodiments, the determination that data written by a GPR write micro operation will only be accessed by the pipeline that executes the micro operation is based on a determination that the micro operation is part of a complex instruction or that the micro operation is part of instruction in a dispatch group. As used herein, a complex instruction in an instruction that contains multiple micro operations.

Figure 3:
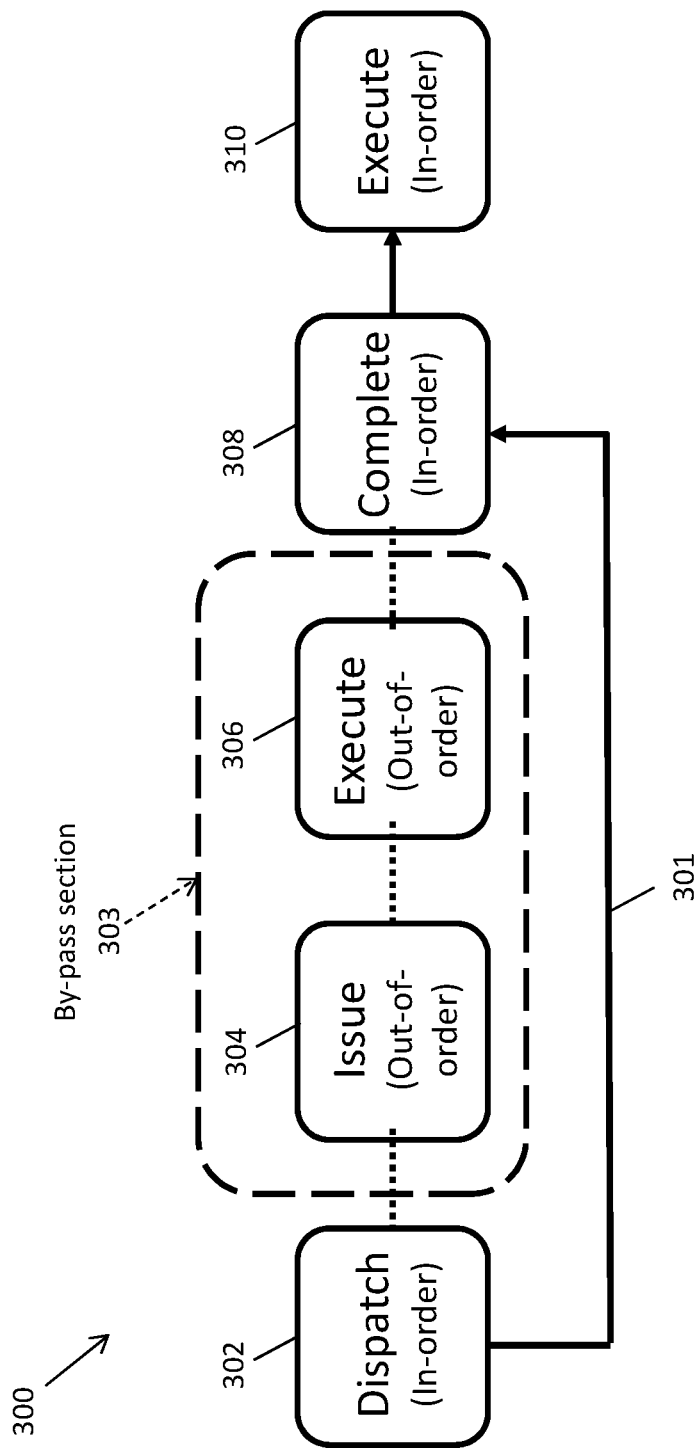
FIG. 3 is a process flow diagram of a method for controlling writing to register files in a processing system having at least two execution pipelines in accordance with an embodiment.

FIG. 3 is a block diagram illustrating an out-of-order execution pipeline 300 including a by-pass operation 301 according to a non-limiting embodiment. The out-of-order execution pipeline 300 includes a dispatch stage 302, an out-of-order issue stage 304, an out-of-order execution stage 306, a completion stage 308, and an in-order execution stage 310.

A dispatch queue (not illustrated) can maintain a queue of tasks for in-order submission to the dispatch stage 302. Unlike conventional out-of-order execution pipelines, the out-of-order execution pipeline 300 described herein performs a by-pass operation 301 that by-passes pipeline section 303, which includes the out-of-order issue stage 304, the out-of-order execution stage 306. In at least one non-limiting embodiment, an instruction identifier within the in-order dispatch stage 302 is used to determine that the instruction encountered belongs to a specific class of instructions which should be by-passed along 301 rather than taking the traditional out-of-order path.

The by-pass operation 301 effectively by-passes or skips allocation of critical out-of-order hardware resources associated with the out-of-order issue stage 304 and out-of-order execution stage 306, while allowing an instruction to architecturally complete before starting instruction execution. In other words, the out-of-order pipeline 300 according to various non-limiting embodiments allows an instruction to bypass allocation of critical out-of-order hardware resources performed in the by-pass section 303, and instead architecturally complete before starting execution of the instruction.

As illustrated in FIG. 3, the pipeline 300 is effectively routed from the dispatch stage 302 directly to the in-order completion stage 308. Accordingly, the out-of-order pipeline 300 essentially routes the start of the execution pipeline to the tail end of the pipeline 300 (i.e., to the completion stage 308, and in-order execution stage 310).

The completion stage 308 operates to re-order the instructions into program order and then completed. Results obtained from the completion stage 308 can provide various execution information regarding the current completed instruction including, but not limited to, the type of the current completed instruction, the logical registers associated with current completed instruction, which registers to read, the registers which are to be written, the number of cycles needed to perform post-completion, and the number of cycles needed for an instruction to determine it is next-to-complete (NTC). This execution information can be stored in a completion table and then utilized for processes performed during the post-completion of the instruction. For example, execution information can be written into a data structure (e.g., a global completion table) at dispatch time, the data structure can be read at completion time, and the read execution information can be transferred to the post-completion execution unit. In other examples, the execution information can be determined from results obtained during the dispatch stage 302.

The execution stage 310 takes place following post-completion and can utilize various units or controllers such as, for example, an integer, floating point, and load/store execution units. In one or more embodiments, the execution stage 310 executes a current instruction by performing a modular arithmetic operation. In other embodiments, the execution stage 310 executes a current instruction by accessing a register that is larger than a GPR. Although not illustrated, a commit unit can also be provided which decides when it is safe to store the result from an execution stage 310. Although a by-pass operation 301 is described, it should be appreciated that the ability to perform the by-pass operation 301 does not preclude an out-of-order processing system from utilizing the out-of-order issue stage 304 and out-of-order execution stage 306 in scenarios that may not require the by-pass operation 301.

In one or more embodiments, the by-pass operation 301 can be invoked in response to detecting a post-completion instruction at the dispatch stage 302. After instruction dispatch, the dispatched group is immediately marked as ready to complete. The necessary instruction information such as an opcode (e.g., macro-ops (Mops) or micro-ops (Uops)), or a command is stored in a completion table until the instruction completes. Upon completion the processor then sends the relevant execution information to the execution unit and updates the architected state. To prevent the subsequent completion of downstream groups, the completion stage 308 is stalled based upon the length of time it takes to execute and write back the last completed Uop. This ensures the intra-instruction Uop dependencies are satisfied within an instruction.

In order to schedule the by-pass operation 301, there is a need to prevent downstream instructions ordered behind an instruction associated with the by-pass operation 301 from reading and writing data to which a post completion executing instruction is currently working on or is about to work on upon completion. These inter-instruction dependencies are traditionally tracked within the issue queue using a dependency structure. In order to skip the issue queue stage, the processor can implement various dependency handling operations to handle inter-instruction dependencies. In at least one embodiment, an instruction sequencing unit is provide, which is responsible for performing the various dependency handling operations described below.

Figure 4:
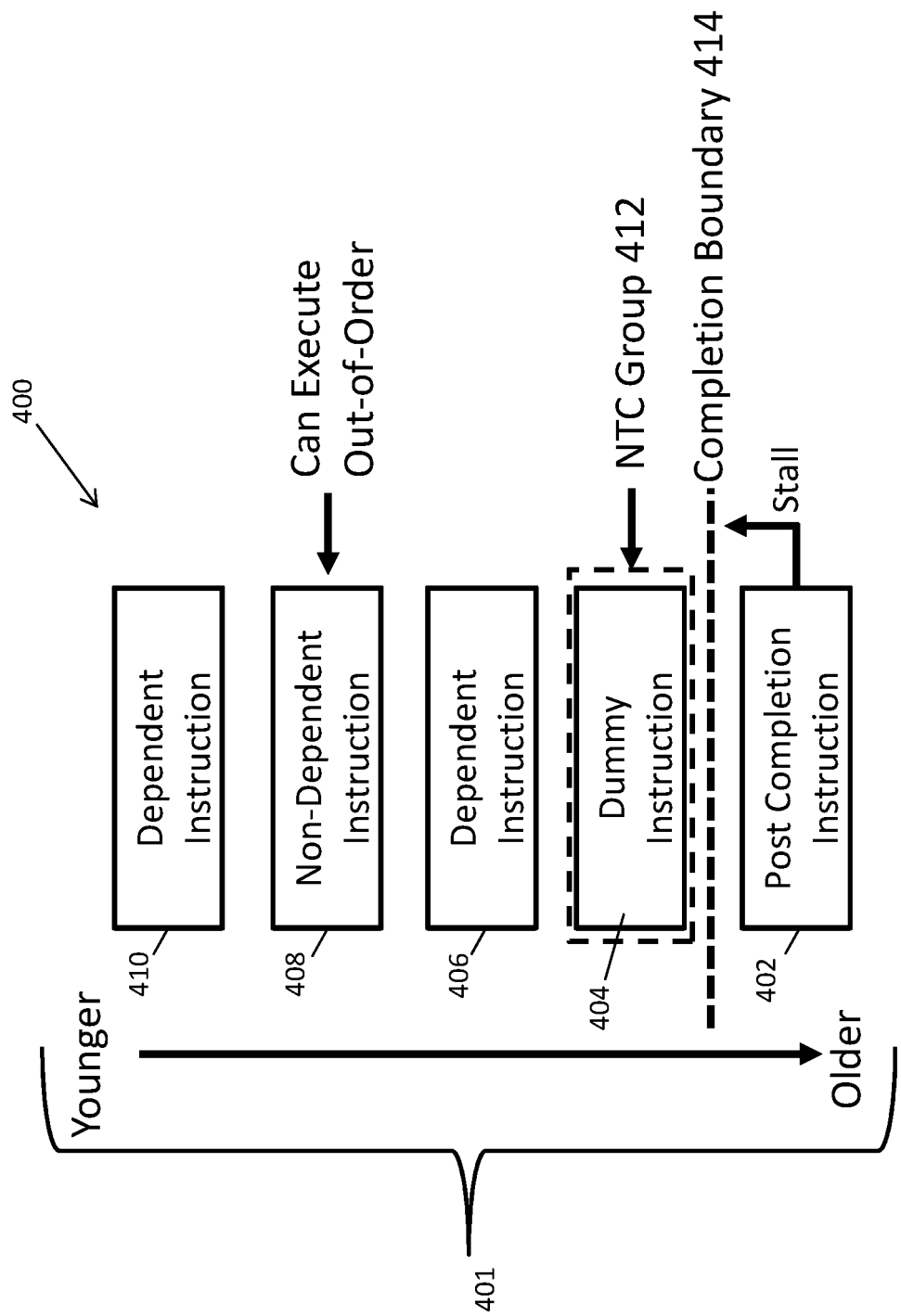
FIG. 4 is a block diagram of an instruction sequence executed by an out-of-order data processing system according to a non-limiting embodiment.

Turning to FIG. 4, an instruction sequence 400 executed by an out-of-order data processing system is illustrated according to a non-limiting embodiment of the invention. The instruction sequence 400 includes a plurality of ordered instructions 401. In this example, the ordered instructions includes a post-completion instruction 402, a dummy instruction 404, a first dependent instruction 406, a non-dependent instruction 408, and a second dependent instruction 410. The dummy instruction 404 is located in a next-to-complete (NTC) position 412, and can be inserted in the NTC position 412 using, for example, millicode.

Millicode can be viewed as a data storage area that is separate and different from the main memory and can be accessed or controlled independent from the OS. The internal millicode contains millicode that is part of the complex architected instructions of the computer system. A complex instruction can be defined as a single instruction to the programmer; however, it may also include internally licensed code which breaks one complex instruction into many less complex instructions. The millicode contains algorithms that have been designed and tested specifically for computer system 10 and can provide full control over the hardware. In at least one embodiment, the millicode can include instructions indicating the insertion of a dummy instruction in the ordered instruction sequence and/or can indicate which instruction included in the ordered instruction sequence is designated by a sequencing instruction. The dummy instruction and/or the sequencing instruction can be utilized to perform a dependency handling operation for handling inter-instruction dependencies, which is described in greater detail below.

A completion boundary 414 is located between the dummy instruction 404 and the post-completion instruction 402. Accordingly, the dummy instruction 404 is located between the post execution instruction 402 and all downstream instructions 406, 408, 410 that may be dependent on the post-completion instruction 402. Accordingly, the processor can mark the downstream instructions 406, 408, 410 that come directly after the dummy instruction 404 to issue only in response to moving into the NTC position 412.

A downstream instruction (e.g., first dependent instruction 406) moves into the NTC position 412 when the dummy instruction 404 eventually completes, which in turn occurs only after the completion-based stall is released. In a non-limiting embodiment, the dummy instruction 404 is held at the NTC position 412 until the post-completion instruction 402 ceases stalling the completion stage. After the stall ends the dummy instruction 404 completes and the following downstream instruction (e.g. dependent instruction 406) becomes moves into NTC position 412 and then becomes eligible for issue. Thus, the dummy instruction 404 is utilized in this example because dependencies are not tracked beyond completion. Accordingly, an instruction must exist prior to completion to prevent downstream ops from getting issued and potentially violating instruction dependencies.

Figure 5:
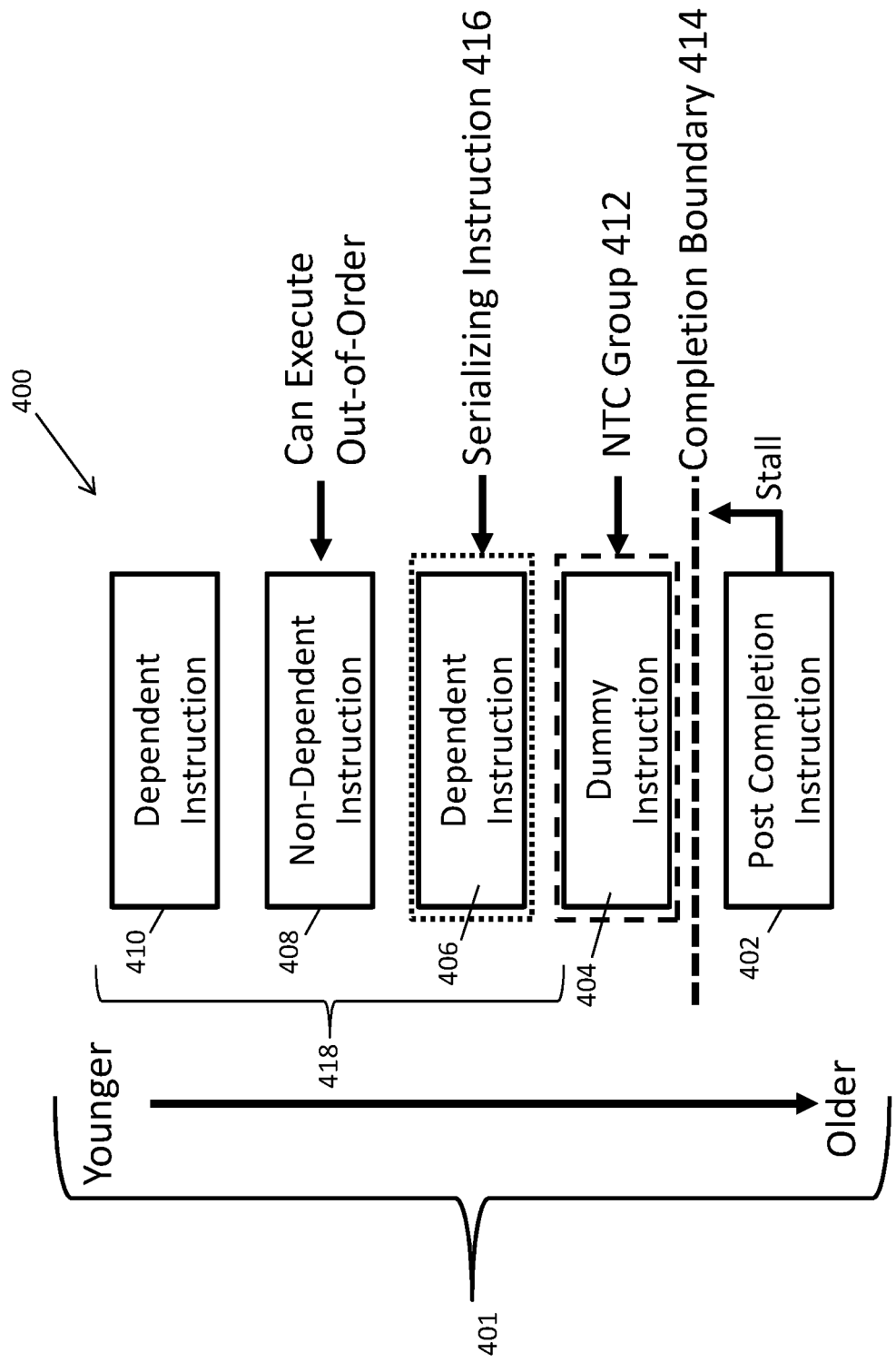
FIG. 5 is a block diagram of an instruction sequence executed by an out-of-order data processing system according to a non-limiting embodiment.

Turning to FIG. 5, a dependency handling operation to handle inter-instruction dependencies is illustrated according to another non-limiting embodiment. A similar instruction sequence 400 as described in FIG. 4 is illustrated, which includes a post-completion instruction 402, a dummy instruction 404, a first dependent instruction 406, a non-dependent instruction 408, and a second dependent instruction 410. The dummy instruction 404 is again inserted in a NTC position 412, and can be inserted using, for example, millicode. A completion boundary 414 is located between the dummy instruction 404 and the post-completion instruction 402.

Instead of using the NTC position 412 in conjunction with each dependent instruction (e.g., instruction 406 and instruction 410) to identify issuance eligibility, the next instruction (e.g., the first dependent instruction 406) following the dummy instruction 404 is marked as a serializing instruction 416. In this embodiment, all dependent downstream operations 418 are marked as dependent on the serializing instruction 416. Once the serializing instruction 416 becomes eligible for issuance (i.e., moves into the NTC position 412 following completion of the dummy instruction 404), the system immediately determines that all dependent downstream operations 418 are also eligible for issuance. The dependency handling operation described in FIG. 5 therefore removes the need for each instruction dependent on the post completion instruction to wait until it reaches the NTC position 412 thereby increasing processing speeds and improving overall run time of the computing system itself.

Another dependency handling operation can omit the dummy instruction based at least in part on execution information stored in a completion table. For example, the system can determine one or more instruction cycle conditions such as, for example, the number of cycles (e.g., $n_{PC}$ cycles) needed to complete the post-completion instruction 402, and the number of cycles ($n_{NTC}$ cycles) needed for a dependent instruction to determine it is next-to-complete (NTC). In response to determining that $n_{NTC} > n_{PC}$, the system can refrain from inserting the dummy instruction, and instead mark the next following dependent instruction to issue directly following completion of the post-completion instruction.

Figure 6:
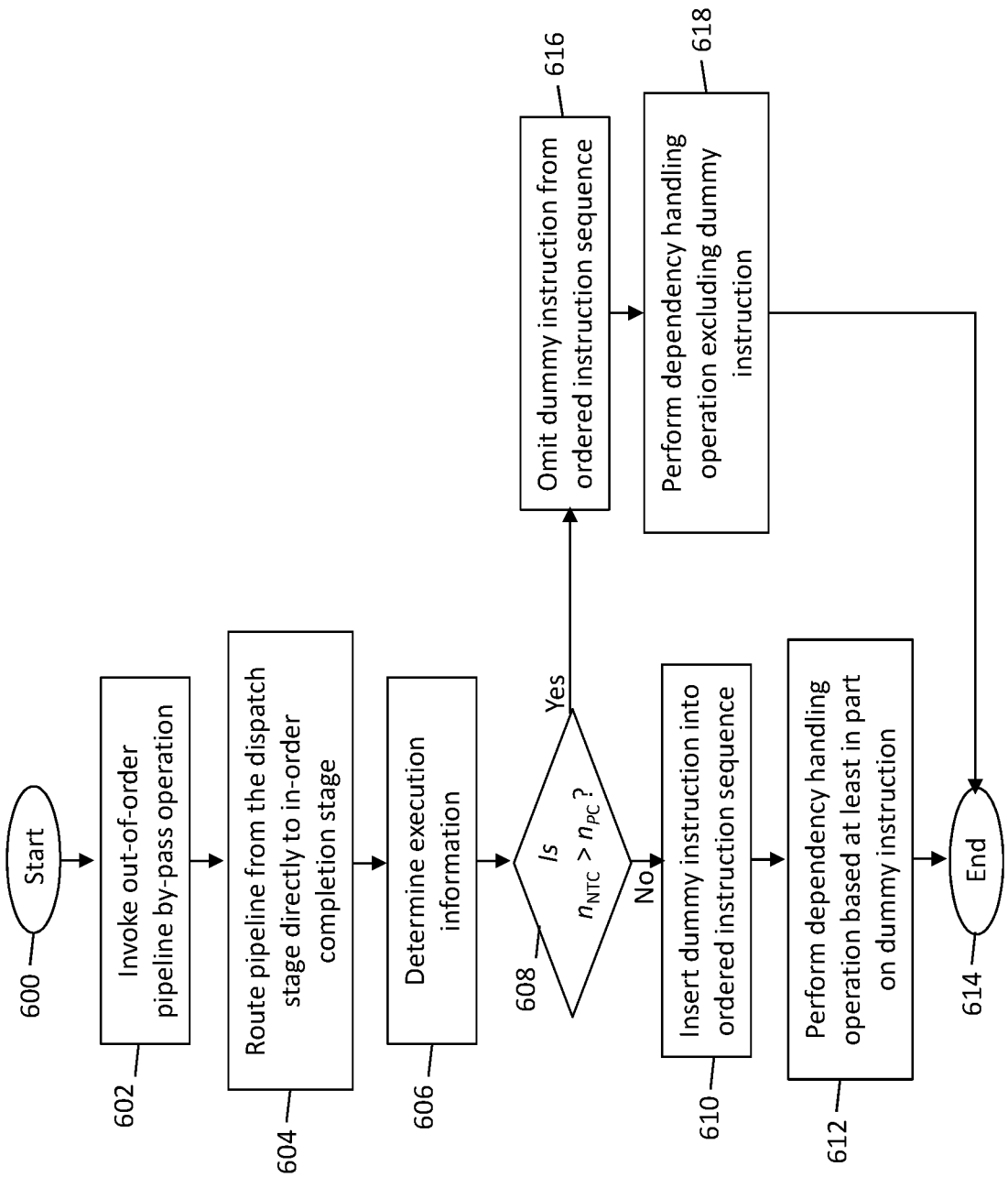
FIG. 6 is a flow diagram illustrating a method of controlling an order of an instruction pipeline of an out-of-order data processing system according to a non-limiting embodiment.

Referring now to FIG. 6, a method of controlling an order of an instruction pipeline of an out-of-order data processing system is illustrated according to a non-limiting embodiment. The method begins at operation 600 and at operation 602 the out-of-order data processing system invokes an out-of-order pipeline by-pass operation. At operation 604, the pipeline is routed from a dispatch stage located at a front of the pipeline directly to an in-order completion stage located at the end of the pipeline. At operation 606, execution information is determined. In one or more embodiments the execution information can be obtained from one or more completion tables implemented by the out-of-order data processing system. At operation 608, a determination is made as to whether a number of cycles ($n_{NTC}$ cycles) needed for a dependent instruction to determine it is next-to-complete (NTC) is greater than a number of cycles (e.g., $n_{PC}$ cycles) needed to complete a current post-completion instruction. When $n_{NTC}$ is greater than $n_{PC}$, a dummy instruction is inserted into the ordered instruction sequence at operation 610. At operation 612, the out-of-order data processing system performs a dependency handling operation based at least in part on the dummy instruction, and the method ends at operation 614.

When, however, $n_{NTC}$ is not greater than $n_{PC}$, the dummy instruction is excluded from the ordered instruction sequence at operation 616. At operation 618, the out-of-order data processing system performs a dependency handling operation without using a dummy instruction, and the method ends at operation 614.

As described herein, various non-limiting embodiments provide a multi-threaded out-of-order superscalar microprocessor system configured to execute a pipeline order that allows an instruction to architecturally complete before starting instruction execution. For example, the multi-threaded out-of-order superscalar microprocessor system can implement an out-of-order pipeline that is effectively routed from the dispatch stage directly to the in-order completion stage. Accordingly, the out-of-order pipeline essentially routes the start of the execution pipeline to the tail end of the pipeline (i.e., to the completion stage, and in-order execution stage). In addition, the out-of-order processing system described herein avoids allocating out-of-order resources for sequences of serialized complex instructions. Instead, the out-of-order processing system described herein can force instructions to execute in-order and without the need to use out-of-order resources.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for controlling an order of an instruction pipeline of an out-of-order data processing system, the method comprising:
    establishing an instruction pipeline including a front end and a back end;
    dispatching a current instruction;
    performing a dependency handling operation to control issuance of at least one dependent instruction that is younger than the current instruction;
    invoking an out-of-order pipeline by-pass operation;
    by-passing a section of the instruction pipeline such that the current instruction architecturally completes before initiating instruction execution; and
    executing, via a post-completion execution unit, the current instruction after the current instruction architecturally completes.

2. The computer-implemented method of claim 1, further comprising:
    writing execution information into a data structure at dispatch time;
    reading the data structure at completion time; and
    transferring the read execution information to the post-completion execution unit.

3. The computer-implemented method of claim 1, wherein executing the current instruction includes performing a modular arithmetic operation.

4. The computer-implemented method of claim 1, wherein executing the current instruction includes accessing a register that is larger than a general purpose register (GPR).

5. The computer-implemented method of claim 1, wherein the dependency handling operation comprises:
    inserting a dummy instruction between the current instruction undergoing post-completion and the at least one dependent instruction in response to meeting an instruction cycle condition; and
    performing the dependency handling operation based at least in part on the dummy instruction.

6. The computer-implemented method of claim 5, further comprising omitting the dummy instruction between the current instruction undergoing post-completion and the at least one dependent instruction in response to missing an instruction cycle condition; and
    performing the dependency handling operation without using the dummy instruction.

7. A computer program product to control an electronic device to control an order of an instruction pipeline of an out-of-order data processing system, the computer program product comprising a computer readable storage medium having program instructions embodied therewith, the program instructions executable by an electronic computer processor to control the electronic device to perform operations comprising:
    establishing an instruction pipeline including a front end and a back end;
    dispatching a current instruction;
    performing a dependency handling operation to control issuance of at least one dependent instruction that is younger than the current instruction;
    invoking an out-of-order pipeline by-pass operation;
    by-passing a section of the instruction pipeline such that the current instruction architecturally completes before initiating instruction execution; and
    executing the current instruction after the current instruction architecturally completes.

8. The computer program product of claim 7, wherein executing the current instruction includes performing a modular arithmetic operation.

9. The computer program product of claim 7, wherein executing the current instruction includes accessing a register that is larger than a general purpose register (GPR).

10. The computer program product of claim 7, wherein the dependency handling operation comprises:
    inserting a dummy instruction between the current instruction undergoing post-completion and the at least one dependent instruction in response to meeting an instruction cycle condition; and
    performing the dependency handling operation based at least in part on the dummy instruction.

11. The computer program product of claim 10, wherein the dependency handling operation further comprises:
  omitting the dummy instruction between the current instruction undergoing post-completion and the at least one dependent instruction in response to missing the instruction cycle condition; and
  performing the dependency handling operation without using the dummy instruction.

12. A computer data processing system comprising:
  an instruction pipeline including a front end and a back end;
  a decoding and dispatch unit configured to dispatch a current instruction;
  a multi-threaded out-of-order superscalar microprocessor configured to perform a dependency handling operation to control issuance of at least one dependent instruction that is younger than the current instruction; and
  a pipeline by-pass unit configured to invoke an out-of-order pipeline by-pass operation configured to by-pass a section of the instruction pipeline such that the current instruction architecturally completes before initiating instruction execution;
  a post-completion execution unit configured to execute the current instruction after the current instruction architecturally completes.

13. The computer data processing system of claim 12, wherein by-passing a section of the instruction pipeline further comprises routing the instruction pipeline directly from a dispatch stage located in the front end to an in-order completion stage located in the back end.

14. The computer data processing system of claim 12, wherein the post-completion execution unit executes the current instruction in response to performing a modular arithmetic operation.

15. The computer data processing system of claim 12, wherein the dependency handling operation comprises:
  inserting, via the multi-threaded out-of-order superscalar microprocessor, a dummy instruction between the current instruction undergoing post-completion and the at least one dependent instruction in response to meeting an instruction cycle condition; and
  performing the dependency handling operation based at least in part on the dummy instruction.

16. The computer data processing system of claim 15, wherein the dependency handling operation further comprises omitting the dummy instruction between the current instruction undergoing post-completion and the at least one dependent instruction in response to missing an instruction cycle condition; and
  performing the dependency handling operation without using the dummy instruction.

* * * * *